US010718243B2

(12) United States Patent
Ichihashi et al.

(10) Patent No.: US 10,718,243 B2
(45) Date of Patent: Jul. 21, 2020

(54) ENGINE AND ENGINE-DRIVEN WORKING MACHINE

(71) Applicant: Hitachi Koki Co., Ltd., Tokyo (JP)

(72) Inventors: Naoto Ichihashi, Ibaraki (JP); Youhei Kinugawa, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 251 days.

(21) Appl. No.: 15/551,039

(22) PCT Filed: Jan. 29, 2016

(86) PCT No.: PCT/JP2016/052699
§ 371 (c)(1),
(2) Date: Aug. 15, 2017

(87) PCT Pub. No.: WO2016/136386
PCT Pub. Date: Sep. 1, 2016

(65) Prior Publication Data
US 2018/0016956 A1 Jan. 18, 2018

(30) Foreign Application Priority Data

Feb. 28, 2015 (JP) .................................. 2015-039691

(51) Int. Cl.
*F01N 3/05* (2006.01)
*F01P 5/06* (2006.01)
(Continued)

(52) U.S. Cl.
CPC .............. *F01N 3/05* (2013.01); *F01N 1/089* (2013.01); *F01N 1/14* (2013.01); *F01N 3/06* (2013.01);
(Continued)

(58) Field of Classification Search
CPC .... F01N 13/10; F01N 13/105; F01N 13/1872; F01N 13/1888; F01N 1/089; F01N 1/14;
(Continued)

(56) References Cited

U.S. PATENT DOCUMENTS 5,857,327 A 1/1999 Sato et al.
2003/0057016 A1 3/2003 Schlossarczyk et al.
(Continued)

FOREIGN PATENT DOCUMENTS

JP 2006-307690 11/2006
JP 2012-026350 2/2012
(Continued)

OTHER PUBLICATIONS

"International Search Report (Form PCT/ISA/210)", dated May 10, 2016, with English translation thereof, pp. 1-3.
(Continued)

*Primary Examiner* — Audrey K Bradley
*Assistant Examiner* — Anthony Ayala Delgado
(74) *Attorney, Agent, or Firm* — JCIPRNET

(57) ABSTRACT

The temperature of exhaust gas discharged from a compact air-cooled engine used as a power source for an engine-driven working machine is reduced. An engine has a muffler mounted directly to the exhaust opening of the cylinder, and a resin muffler cover covering the muffler. An exhaust gas restriction member is provided to a wall surface of the muffler, and two exhaust passages serving as outlets for exhaust gas are formed in the exhaust gas restriction member. The exhaust passages are arranged independent of each other, and the streams of discharged exhaust gas are discharged to be slightly separated from each other as the streams flow away from the exhaust openings. The separated streams of discharged exhaust gas form a negative pressure space between the streams promoting the introduction of a (Continued)

cooling air stream into the negative pressure portion. Thus, the temperature of the exhaust gas can be reduced.

12 Claims, 7 Drawing Sheets

(51) Int. Cl.

| | | |
|---|---|---|
| *F01P 1/06* | (2006.01) | |
| *F01P 5/02* | (2006.01) | |
| *F01N 3/28* | (2006.01) | |
| *F01N 13/18* | (2010.01) | |
| *F02B 63/02* | (2006.01) | |
| *F01N 1/08* | (2006.01) | |
| *F01N 13/10* | (2010.01) | |
| *F01N 1/14* | (2006.01) | |
| *F01N 3/06* | (2006.01) | |
| *F01P 1/02* | (2006.01) | |
| *F01P 5/04* | (2006.01) | |
| *F02F 1/06* | (2006.01) | |
| *F02B 75/02* | (2006.01) | |

(52) U.S. Cl.
CPC ........... *F01N 3/2885* (2013.01); *F01N 13/10* (2013.01); *F01N 13/105* (2013.01); *F01N 13/1872* (2013.01); *F01N 13/1888* (2013.01); *F01P 1/02* (2013.01); *F01P 1/06* (2013.01); *F01P 5/02* (2013.01); *F01P 5/04* (2013.01); *F01P 5/06* (2013.01); *F02B 63/02* (2013.01); *F02F 1/06* (2013.01); *F01N 2230/06* (2013.01); *F01N 2470/14* (2013.01); *F01N 2590/06* (2013.01); *F01P 2001/023* (2013.01); *F02B 2075/025* (2013.01); *Y02T 10/20* (2013.01)

(58) Field of Classification Search
CPC ............. F01N 2230/06; F01N 2470/14; F01N 2590/06; F01N 3/05; F01N 3/06; F01N 3/2885; F01P 1/02; F01P 1/06; F01P 2001/023; F01P 5/02; F01P 5/04; F01P 5/06; F02B 2075/025; F02B 63/02; F02F 1/06; Y02T 10/20
See application file for complete search history.

(56) References Cited

U.S. PATENT DOCUMENTS

| | | | |
|---|---|---|---|
| 2004/0154289 A1 | 8/2004 | Schlossarczyk et al. | |
| 2012/0180322 A1* | 7/2012 | Takeda ............... | F01M 11/0004 30/276 |

FOREIGN PATENT DOCUMENTS

| | | |
|---|---|---|
| JP | 2013-068140 | 4/2013 |
| WO | 0236942 | 5/2002 |

OTHER PUBLICATIONS

"Office Action of Europe Counterpart Application", dated Feb. 21, 2019, p. 1-p. 6.
"Search Report of Europe Counterpart Application", dated Jul. 30, 2018, p. 1-p. 7.
"Summons to attend oral proceedings pursuant to Rule 115(1) EPC of European Counterpart Application", dated May 23, 2019, p. 1-p. 6.
Office Action of China Counterpart Application, with English translation thereof, dated Dec. 12, 2019, pp. 1-16.

\* cited by examiner

ENGINE AND ENGINE-DRIVEN WORKING MACHINE

CROSS-REFERENCE TO RELATED APPLICATION

This application is a 371 application of the international PCT application serial no. PCT/JP2016/052699, filed on Jan. 29, 2016, which claims the priority benefit of Japan application no. 2015-039691, filed on Feb. 28, 2015. The entirety of each of the abovementioned patent applications is hereby incorporated by reference herein and made a part of this specification.

TECHNICAL FIELD

The present invention mainly relates to a muffler structure configured to decrease a temperature of an exhaust gas discharged from a small air-cooled engine used as a power source of a portable engine-driven working machine such as a bush cutter, an air blower, or the like.

BACKGROUND ART

A small engine serving as a power source is used in a portable working machine or a generator that is carried and used by an operator, for example, a bush cutter, an air blower, a chain saw, a power cutter, or the like. FIG. 8 is an exterior view of a bush cutter serving as an example of an engine-driven working machine 501 in the related art. The engine-driven working machine 501 on which a small 2-cycle engine is mounted rotates a rotating blade 512 installed at the other end of a main pipe 504 due to a driving shaft (not shown) passing through the main pipe 504 on the pipe and the driving shaft being rotated using an engine 510 installed at one end of the main pipe. A scattering prevention cover 513 configured to prevent scattering of reaped grass is installed in the vicinity of the rotating blade 512. The engine-driven working machine 501 is carried by a shoulder belt or the like (not shown), and a handle 508 having a U shape when seen in a front view and configured to be operated by an operator is attached to the vicinity of a longitudinal central portion of the main pipe 504. The rotational speed of the engine is controlled by an operator using a throttle lever 507 attached to a grip portion 509. An operation of the throttle lever 507 is transmitted to a carburetor 25 of the engine 510 by a throttle wire 523.

Since a high temperature exhaust gas (hereinafter, simply referred to as "an exhaust gas") after combustion is discharged according to the reciprocal movement of a piston and explosion due to combustion of a fuel-air mixture in a cylinder of the engine, the surroundings of a muffler are covered with a muffler cover 540 such that an operator does not directly come into contact with the heated muffler. In addition, in recent years, various ideas have been proposed to prevent a surface temperature of the muffler cover from being excessively increased or to decrease a temperature of an exhaust gas discharged outside of the muffler cover as much as possible. For example, in order to diffuse the exhaust gas discharged from the muffler, a technology of achieving a decrease in exhaust gas temperature by forming a plurality of small holes in a discharge port of the muffler or causing some of engine-cooling air to flow around a muffler chamber as disclosed in Patent Literature 1 may be provided.

CITATION LIST

Patent Literature

[Patent Literature 1]
Japanese Unexamined Patent Application Publication No. 2013-68140

SUMMARY OF INVENTION

Technical Problem

In the engine-driven working machine in the related art, cooling of a cylinder and a muffler that are heated to a high temperature is an important task. For this reason, upon an operation of the engine, the muffler is cooled with cooling air after rotating a cooling fan attached to a crankshaft and cooling the cylinder. The cooling air sent from the cooling fan flows around the muffler and escapes outside the muffler cover. Here, in order to prevent high temperature air after cooling the muffler from directly hitting an operator, a cooling air discharge port is configured to be spaced apart from the muffler cover. However, according to a review of the inventor(s), it has been confirmed that in the structure, a clearance between the muffler and the muffler cover has had to be enlarged, and the engine weight and overall size have had to be increased. In addition, in the structure in which the plurality of small holes are formed in the discharge port of the muffler, it has been confirmed that, as a result of the exhaust gas flows discharged from the small holes being attracted to and merging with each other due to a negative pressure generated by a flow velocity thereof, the exhaust gas flow cannot be easily mixed with the cooling air taken into the muffler chamber, and an exhaust gas temperature cannot be sufficiently decreased.

In consideration of the above-mentioned circumstances, an object of the present invention is directed to provide an engine and an engine-driven working machine in which an exhaust gas discharged from a muffler is effectively diverted to and further mixed with air to decrease a temperature of the exhaust gas.

Another object of the present invention is directed to provide an engine and an engine-driven working machine that are capable of effectively cooling a muffler using an airflow generated by a cooling fan and an airflow suctioned from external air.

Still another object of the present invention is to provide an engine and an engine-driven working machine in which the heat insulation performance of a muffler cover with respect to a muffler main body can be improved and increase in temperature of a surface of the muffler cover can be minimized such that an operator can work more comfortably.

Solution to Problem

Representative features of the present invention disclosed herein will be described as follows. According to a feature of the present invention, there is provided an engine having: a cylinder having a plurality of fins on an outer circumferential section thereof and in which a combustion chamber is formed; a cooling fan installed at one end of a crankshaft and configured to generate cooling air to cool the cylinder; and a muffler attached to an exhaust opening of the cylinder, wherein an exhaust gas outlet is installed in the muffler, an exhaust gas restriction member configured to determine a discharge direction of exhaust gas is installed at the exhaust gas outlet, and the exhaust gas restriction member is configured to have a plurality of exhaust passages arranged in parallel such that exhaust gas flows have exhaust directions such that they are disposed parallel to and spaced apart from each other. Here, some of the cooling air may be introduced in the exhaust direction of the exhaust gas of the muffler. Since the plurality of exhaust passages spaced apart from each other in this way are installed in the exhaust gas restriction member, a strong negative pressure can be generated between the exhaust gas flows having a high flow velocity flowing out of the exhaust passages due to ejection effects producing synergy therebetween. Since a large amount of air can be suctioned from the surroundings due to the negative pressure and air is mixed with the exhaust gas, the exhaust gas temperature can be effectively lowered. In addition, a muffler cover configured to cover the muffler to form a muffler receiving chamber is attached to the engine, and the exhaust gas restriction member is configured to discharge exhaust gas into a space between the muffler cover and the muffler. The muffler cover has a ventilator window, and external air passing through the ventilator window is introduced between the exhaust gases discharged from the plurality of exhaust passages.

According to another feature of the present invention, the exhaust direction of the exhaust gas is configured to allow the exhaust gas to flow along an outer surface of the muffler, and the exhaust gas flows from openings of the exhaust passages to an end surface of the muffler to be discharged into the atmosphere from the exhaust outlet of the muffler cover. Here, since the opposite wall surfaces of the exhaust passages are formed to be inclined (for example, a separation angle is 20 degrees) to separate further from each other toward a downstream side in the exhaust gas outflow direction, it is possible to prevent the exhaust gases from being attracted to and merging with each other due a mutual ejection effect. Accordingly, a strong negative pressure can be reliably generated between the exhaust gases. The exhaust gas restriction member is configured to hold a spark arrester installed at the exhaust gas outlet, and exhaust gas passing through the spark arrester is discharged into a space in the muffler cover through the exhaust passage. The exhaust gas restriction member is manufactured by punching of a metal plate, the exhaust passage is a convex section formed by punching, and an opening is formed in an end portion of the convex section.

According to another feature of the present invention, the muffler is made to configure a casing by opening surfaces of a first housing and a second housing being aligned with each other with a partition plate therebetween, a first expansion chamber into which an exhaust gas from an exhaust opening of the cylinder is first introduced and a second expansion chamber through which the exhaust gas introduced via a through-hole is discharged to the outside from the exhaust opening are configured by forming the through-hole in the partition plate, the first housing is connected to an engine port, and the exhaust gas restriction member is disposed at one surface of the second housing opposite to the muffler cover.

According to another feature of the present invention, opposite wall surfaces of the exhaust passages are formed to be inclined to be spaced further apart from each other toward a downstream side in the exhaust gas outflow direction. The plurality of exhaust passages have non-opposite wall surfaces which are formed to be parallel to each other. Since the non-opposite wall surfaces of the exhaust passages are formed parallel to each other, it is possible to suppress excessive diffusion of the exhaust gases flowing out of the exhaust passages and degradation of the synergy due to ejection effects. Further, thermal degradation does not occur in the muffler cover due to excessive diffusion of the exhaust gases and unintended contact with the muffler cover. When the plurality of exhaust passages are formed independently from an inlet side to an opening of an outlet, an air passage for the cooling air introduced from the cooling fan can be formed between the exhaust passages. Air may also be supplied into a negative pressure portion formed between the exhaust gas flows from a space (a space in a non-exhaust gas outflow direction) other than one in the exhaust gas outflow direction of the exhaust passage via the air passage, further reducing the exhaust gas temperature. In addition, the plurality of exhaust passages may be formed such that the introduction sides thereof are a common space, and a plurality of pipelines that form openings from the common space may be formed to extend. When a common inlet side is formed in this way, compact exhaust passages can be formed when two exhaust passages are secured.

According to another feature of the present invention, since the muffler cover is manufactured by integrally molding a synthetic resin and the plurality of ventilator windows communicating with the external air are formed at any position downstream from a portion opposite to the exhaust passage in the exhaust gas outflow direction, the external air can be directly suctioned into the negative pressure portion between the exhaust gas flows via the muffler cover. When the air temperature in the muffler cover has increased through heating by the muffler surface, the external air temperature is a normal temperature (for example, 20° C.) with no increase. Accordingly, since a normal temperature air that has not been heated by a heating surface of the engine, the muffler surface, or the like, can be directly supplied to the exhaust gas, the exhaust gas temperature can be further lowered. In addition, while the temperature of the ventilator window section of the muffler cover can be increased by radiant heat from the muffler, since the muffler cover is cooled by a flow of the external air, an effect of lowering the muffler cover temperature can also be exhibited.

According to the present invention, since a negative pressure space is formed between a plurality of exhaust gas flows using a discharge action of the exhaust gas in a forced air-cooled engine in which some of cooling air is supplied into a muffler by a cooling fan and a large amount of air can be supplied into the negative pressure space, an outer surface of the muffler can be effectively cooled while a temperature of the exhaust gas can be lowered. The above and other objects and novel features of the present invention will become apparent from the following description and drawings.

DESCRIPTION OF EMBODIMENTS

Embodiment 1

Figure 1:
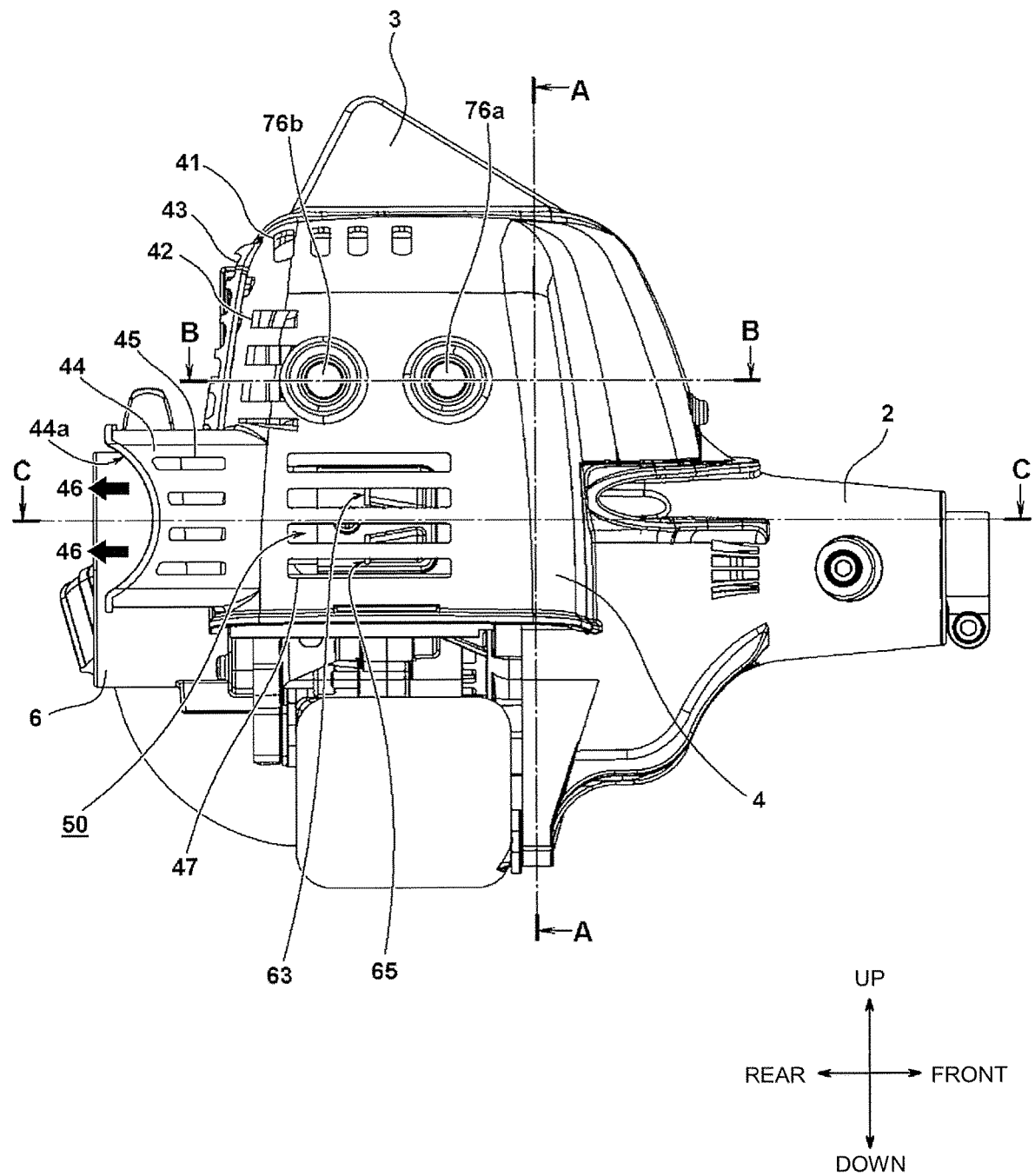
FIG. 1 is a right side view of an engine-driven working machine 1 according to an embodiment of the present invention.

Hereinafter, an embodiment of the present invention will be described with reference to the accompanying drawings. Further, in the following drawings, the same parts are designated by the same reference numerals, and repeated description thereof will be omitted. Further, in the following description, forward, rearward, leftward, rightward, upward and downward directions are as shown in the drawings.

Figure 8:
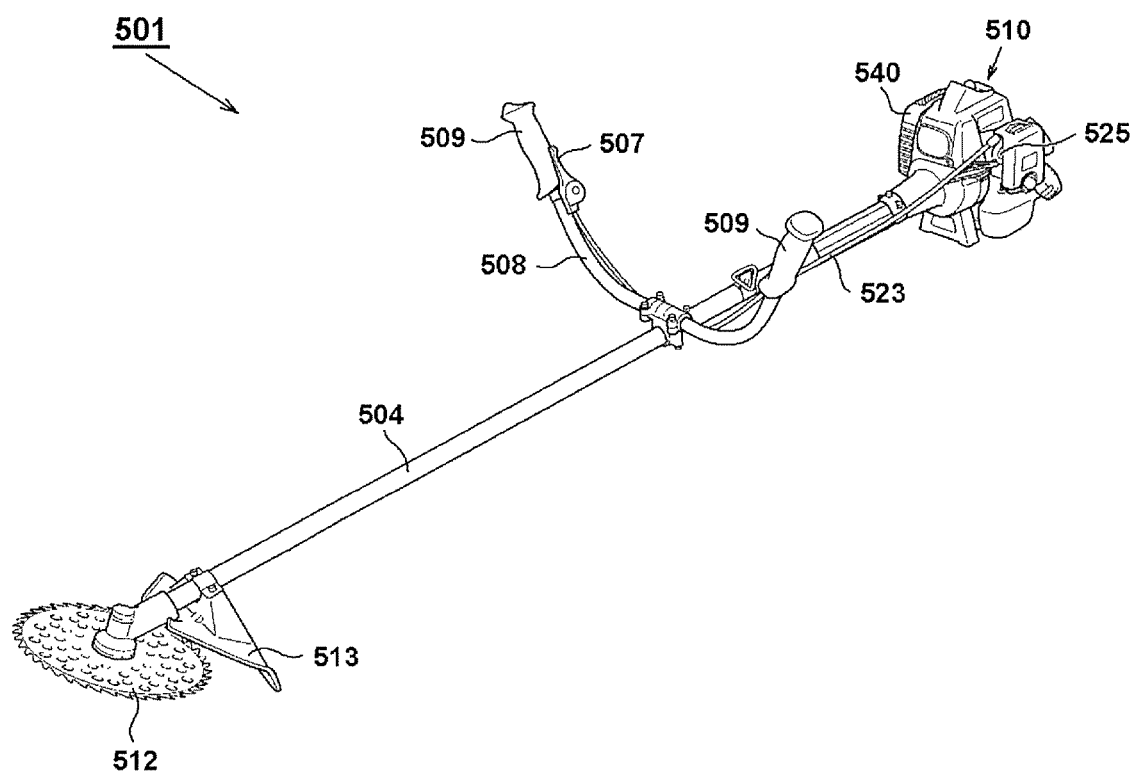
FIG. 8 is a perspective view showing an example of an engine-driven working machine (a bush cutter) in the related art.

FIG. 1 is a right side view of an engine part of an engine-driven working machine 1 according to an embodiment of the present invention. Here, a main body of the engine-driven working machine 1 when a small engine is applied to a bush cutter as shown in FIG. 8 is shown. Illustration of a power transmission mechanism such as a main pipe attached to a front side of a main housing 2, a rotating blade held at a tip of the main pipe, or the like, is omitted. A 2-cycle engine (not shown) is accommodated in the main housing 2. Here, a crankshaft of the engine extends in a forward/rearward direction, a piston is disposed in a cylinder that forms a combustion chamber such that it is able to reciprocate in an upward/downward direction, a recoil starter (not shown) is disposed at a rear end of the crankshaft on a rear side of the engine, and the power for a working device is taken out of a front side of the engine via a centrifugal clutch (not shown). Substantially the entire upper side of the engine is covered by a top cover 3 formed of a resin, and the recoil starter (not shown) is covered by a recoil cover 6. A muffler 50 is fixed to a side surface of one side (a right side surface) of the engine using two attachment bolts 76a and 76b. Here, the entire muffler 50 is covered by a muffler cover 4 manufactured by integrally forming a synthetic resin. The muffler cover 4 is a cover installed to prevent an operator from directly coming into contact the heated muffler 50 and disposed to be spaced at a predetermined interval from a housing of the muffler 50. An exhaust gas discharged from the muffler 50 is discharged into a space (a muffler chamber) between the muffler cover 4 and the muffler 50. The muffler cover 4 implements an action of guiding the discharged exhaust gas to the outside (into the atmosphere) from the muffler chamber of the muffler cover 4. The muffler 50 has two exhaust openings 63 and 65 opening in a rearward direction, and the exhaust gas discharged from the exhaust openings 63 and 65 is discharged to the atmosphere from an opening portion having an arc-shaped opening edge 44a on a rear side of an extension passage 44 through a space defined by the muffler cover 4 in a direction of an arrow 46. Here, the extension passage 44 of the muffler cover 4 has a predetermined length from the exhaust openings 63 and 65 to the external air and is formed to have a predetermined volume, and an opening surface area thereof is sufficiently larger than a sum of opening surface areas of the exhaust openings 63 and 65.

A plurality of slit-shaped ventilator windows 41 to 43 are installed at the muffler cover 4 to improve heat dissipation when the engine is stopped. In addition, while the extension passage 44 having an opening serving as an exhaust outlet at a rear side, which is a tubular passage, is formed at a rear side of the muffler cover 4, the extension passage 44 is manufactured integrally with the muffler cover 4. The recoil cover 6 is disposed inside the extension passage 44 (adjacent to the crankshaft). A plurality of slit-shaped ventilator windows 47 formed at a side surface of the muffler cover 4, and a plurality of slit-shaped ventilator windows 45 are installed at the extension passage 44. Further, although the muffler cover 4 and the extension passage 44 are formed in the embodiment, these may be integrally formed rather than being clearly separated.

Figure 2:
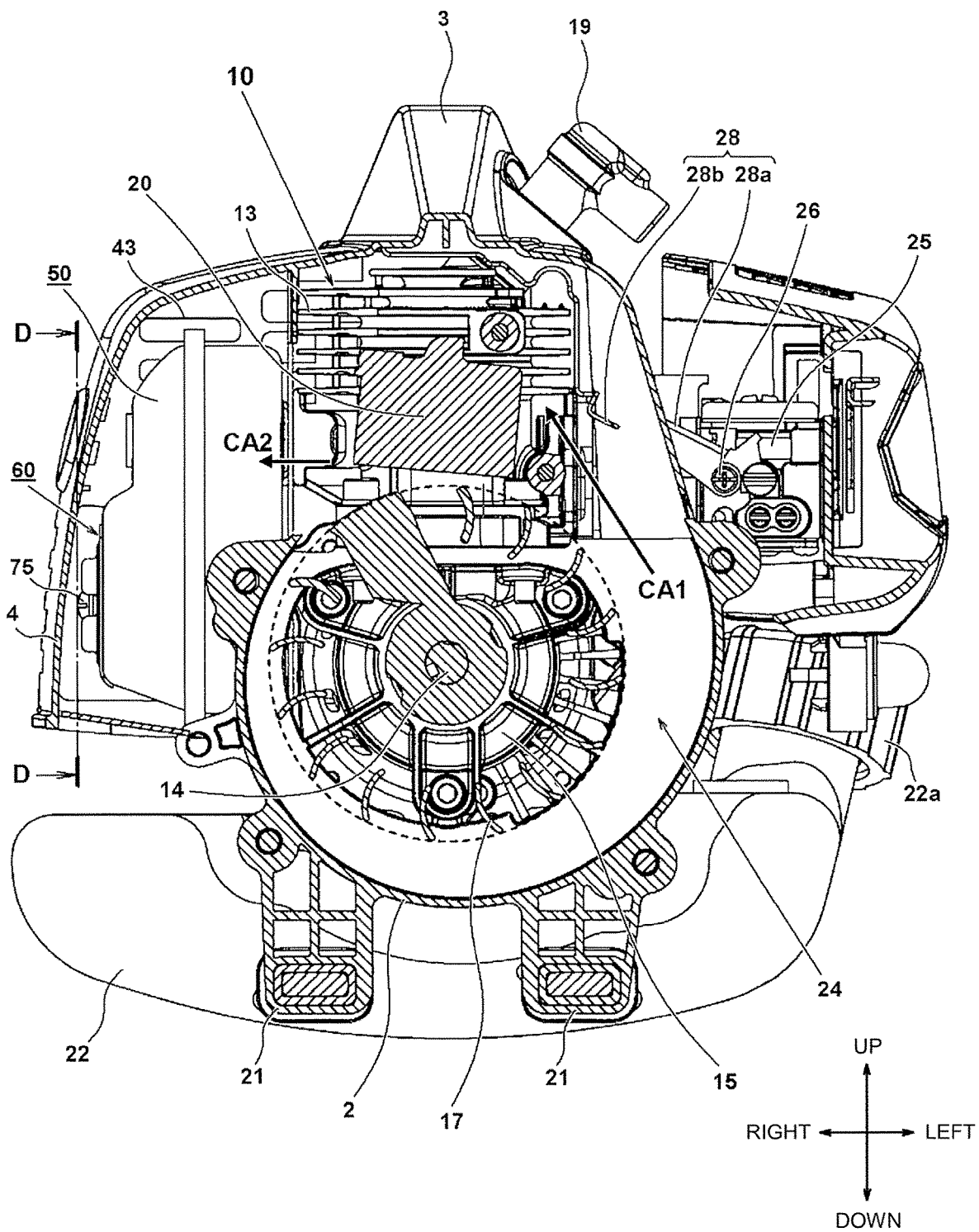
FIG. 2 is a cross-sectional view taken along line A-A of FIG. 1.

FIG. 2 is a longitudinal cross-sectional view of the engine part of the engine-driven working machine 1 according to the embodiment of the present invention. An engine 10 is a small 2-cycle engine, a crankshaft 14 is disposed concentrically with respect to the main pipe 504 (not shown, see FIG. 8), a cylinder 13 is disposed to extend upward from a crank case 15 in a substantially vertical direction, and a piston 12 (to be described below with reference to FIG. 3) is reciprocal in the cylinder 13 in the upward/downward direction. The cylinder 13 has a plurality of fins formed at an outer circumferential section thereof, a carburetor 25 and an air cleaner (not shown) are connected to an intake port (to be described below with reference to FIG. 3), and the muffler 50 is connected to an exhaust opening of the cylinder 13. One end portion of a driving shaft (not shown) is connected to a front side (an output side) of the crankshaft 14 via a centrifugal clutch 18 (see FIG. 3, to be described below). An engine cooling fan is integrally formed with a magnet rotor 17 to which the centrifugal clutch 18 is attached, and the magnet rotor 17 itself functions as a cooling fan. A fan chamber 24 is formed by the crank case 15, the main housing 2 (see FIG. 1) and the top cover 3. An air intake port of the fan chamber 24 is disposed at a wall section of an inner circumferential side of the main housing 2 that covers an outer circumferential section of the magnet rotor 17. An inner wall surface of the main housing 2 is formed such that a distance from a center to an inner circumferential wall is gradually increased counterclockwise to be matched to a rotational direction of the magnet rotor 17 with respect to a center, and formed to be smoothly connected to an inner wall surface of the top cover 3 at which the distance is a maximum. In such a configuration, when the magnet rotor 17 is rotated, an air represented by CA1 flows and is guided to the parts of the cylinder 13 by the top cover 3. Some of the air, represented by CA2, reaches an installation space (a muffler chamber) of the muffler 50 from surroundings of the cylinder 13 via an air introduction opening section.

A high voltage current generated by an ignition coil 20 is transmitted to an ignition plug (not shown) via a high voltage cord (not shown) and a plug cap 19. A fuel tank 22 is installed under the crank case 15. An oil blend of gasoline and oil is poured into the fuel tank 22, and a fuel cap 22a is installed at an opening section of the fuel tank 22. A tank holding section 21 is formed under the main housing 2. An intake amount of the engine 10 is adjusted by disposing a throttle shaft 26 at the carburetor 25 and opening/closing a butterfly type throttle valve (not shown) in an intake passage (not shown) in conjunction with the throttle shaft 26, and a rotational speed or an output of the engine are adjusted. In a working state, an air power governor 28 is used for control for maintaining the rotational speed of the engine 10 at a substantially constant level. The throttle shaft 26 passes from a rear surface to a front surface of the carburetor 25, and the airflow force governor 28 is attached to a front side using a screw. The airflow force governor 28 has an arm section 28a configured to axially swing the throttle shaft 26, and a governor plate 28b is installed at a tip of the arm section 28a. The governor plate 28b is disposed in an air duct of a cooling air CA1.

The governor plate 28b can transmit a pivotal torque to the throttle shaft 26 in a predetermined direction (in FIG. 1, clockwise) by receiving the cooling air CA1, and a rotational speed of the engine 10 is adjusted by pivoting the throttle shaft 26. During an operation of the engine-driven working machine, when the rotational speed of the engine 10 is decreased by a load received from a tip tool, since the amount of cooling air CA1 is reduced, the airflow force governor 28 rotates the throttle shaft 26 in an acceleration direction. Meanwhile, when the rotational speed of the engine 10 is increased by reduction or elimination of a load received from the tip tool, since the cooling air CA1 is increased, the airflow force governor 28 rotates the throttle shaft 26 in a deceleration direction.

Figure 3:
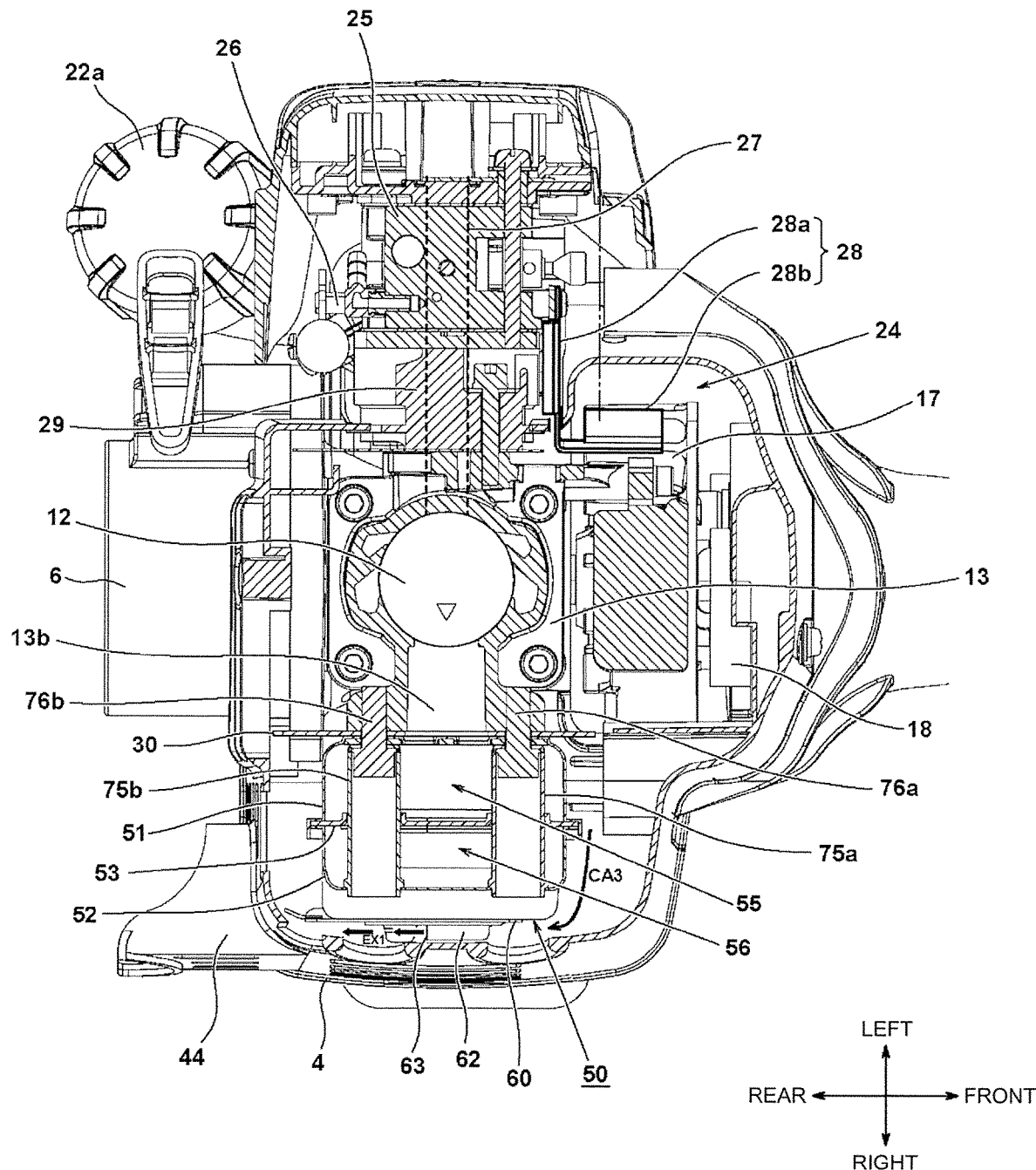
FIG. 3 is a cross-sectional view taken along line B-B of FIG. 1.

FIG. 3 is a cross-sectional view taken along line B-B of FIG. 1. An intake device such as the carburetor 25 or the like is disposed at a left side of the cylinder 13, and the muffler 50 is fixed to an exhaust opening 13b of a right side by two bolts 76a and 76b via a heat shield plate 30. An insulator 29 formed of a resin or a light metal that forms a portion of an intake passage 27 shown by a dotted line in FIG. 3 is installed at an intake port side of the cylinder 13, and the carburetor 25 is fixed to the insulator 29. The throttle shaft 26 passes from a front side surface to a rear side surface of the carburetor 25, and the airflow force governor 28 is fixed to a front end of the throttle shaft 26. The magnet rotor 17 is installed at a front end portion of the crankshaft 14 (see FIG. 2). The governor plate 28b of the airflow force governor 28 is disposed in the fan chamber 24. An opening section (not shown) is formed in the top cover 3 configured to handle the airflow force governor 28 in the fan chamber 24, and the airflow force governor 28 is positioned to extend from the outside of the top cover 3 into an internal space.

The muffler 50 is obtained by matching and joining opening sections of an inner housing 51 and an outer housing 52 having a container shape with a partition plate 53 sandwiched therebetween at a center in a leftward/rightward direction, and two expansion chambers (a first expansion chamber 55 and a second expansion chamber 56) are formed therein. Here, an opening (an intake port) of the first expansion chamber 55 is formed to be directly fixed to the cylinder 13, and in order to fix them, cylindrical sleeves 75a and 75b are formed to pass through the outer housing 52 and the partition plate 53 to be fixed by the two bolts 76a and 76b. The exhaust openings 63 and 65 (not shown in FIG. 3) of the muffler 50 are disposed such that opening surfaces thereof extend upward, downward, leftward and rightward, and an exhaust gas flows substantially parallel to a right side surface of the outer housing 52 toward a rear side along the outer surface of the muffler 50 to be discharged to the outside of the muffler cover 4. The exhaust gas discharged from the exhaust opening 63 of an exhaust gas passage 62 flows in a direction of an arrow EX1 and flows between the muffler cover 4 and the muffler 50 to be discharged to the outside through the extension passage 44. Further, while not shown in FIG. 3, an exhaust gas discharged from the exhaust opening 65 (also see FIG. 4) of an exhaust gas passage 64 flows in the same direction.

Figure 4:
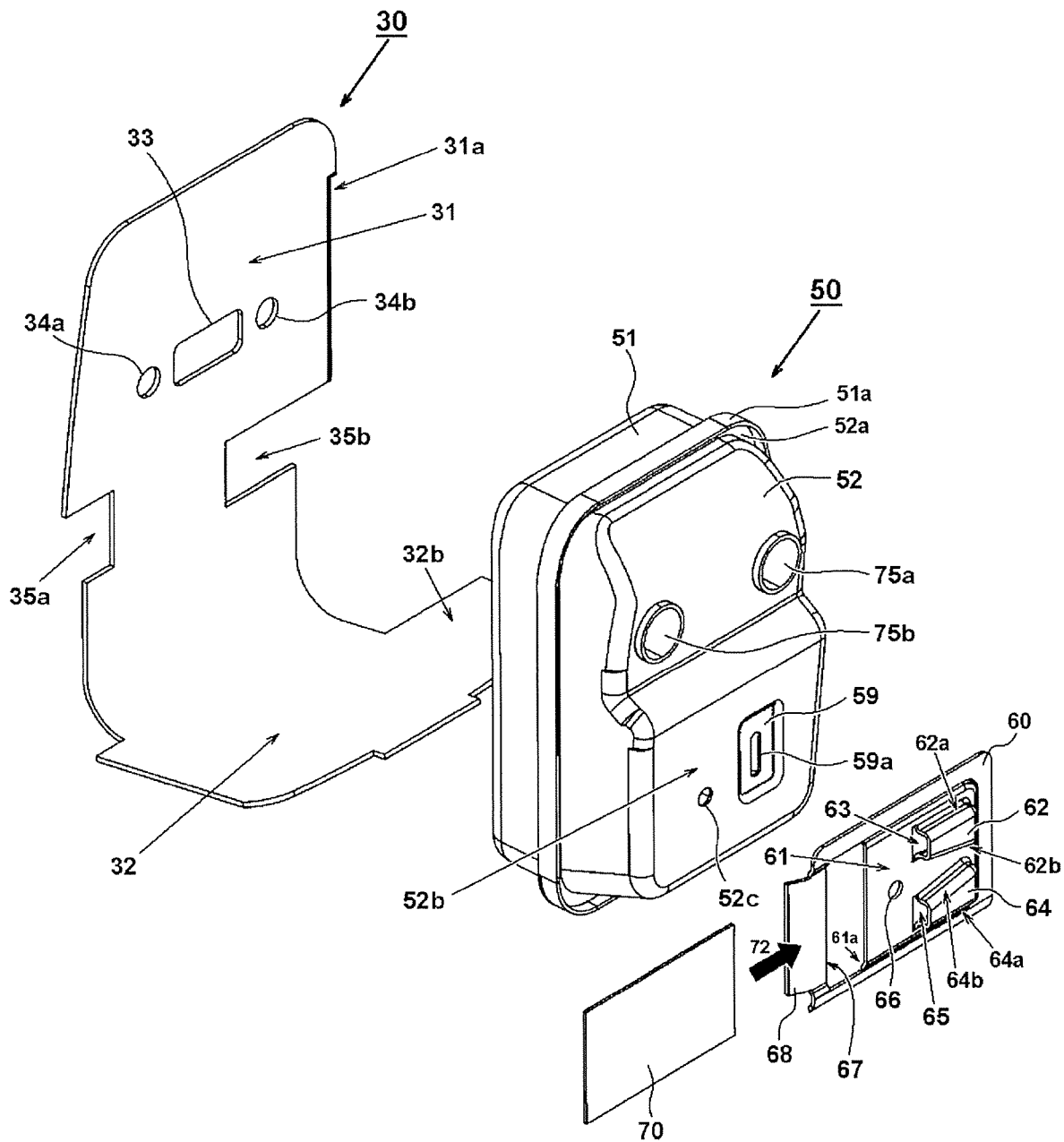
FIG. 4 is an exploded perspective view in the vicinity of a muffler 50 of the engine-driven working machine 1 according to the embodiment of the present invention.

FIG. 4 is an exploded perspective view in the vicinity of the muffler 50 of the engine-driven working machine 1 according to the embodiment of the present invention. The housing of the muffler 50 is a substantially rectangular parallelepiped casing constituted by matching opening surfaces of the inner housing (a first housing) 51 and the outer housing (a second housing) 52 to each other. The inner housing 51 and the outer housing 52 are joined at a divided surface substantially perpendicular to a discharge direction of the exhaust gas discharged from the exhaust opening 13b (see FIG. 3) of the cylinder 13. An exhaust gas outlet 59a is formed at an opposite side (a side opposite to a cylinder, here, a right side) of the cylinder 13 of the muffler 50, and the exhaust gas is discharged therefrom to the outside of the expansion chamber. The inner housing 51 and the outer housing 52 are manufactured by punching of a cold rolled steel plate, a rib 52a is formed at an outer edge portion of the outer housing 52, a turn-up section 51a configured to accommodate the rib 52a is formed at an outer edge portion of the inner housing, and these are joined by brazing. A spark arrester 70 having a metal net shape is fixed to the muffler 50 of the embodiment, and an exhaust gas restriction member 60 configured to guide the exhaust gas discharged from the exhaust gas outlet 59a in a predetermined direction is provided. The exhaust gas restriction member 60 is one surface of the outer housing 52 and fixed to a lower side surface 52b having a planar shape and opposite to the muffler cover 4 through welding or the like. A cavity 59 is formed at a portion of the lower side surface 52b of the outer housing 52 such that the spark arrester 70 is effectively applied, and a predetermined space (a space 71 in FIG. 6 to be described below) is formed by the cavity 59. A screw hole 52c is formed in the lower side surface 52b of the outer housing 52 adjacent to the cavity 59. Through-holes are formed in an upper side surface (a right side surface) of the outer housing 52, and the two cylindrical sleeves 75a and 75b configured to pass through the bolts 76a and 76b (see FIG. 1) are welded to the through-holes.

The exhaust gas restriction member 60 is a member configured to form a passage through which the exhaust gas is discharged from the exhaust gas outlet 59a to the outside of the muffler 50, and two independent convex sections are formed by punching a metal plate. The exhaust gas passages 62 and 64 are formed by forming openings in end portions of the convex sections. The exhaust gas passages 62 and 64 are convex protrusions having the exhaust openings 63 and 65, respectively, the exhaust openings 63 and 65 serving as openings are disposed at positions separated at upper and lower sides, and the opening surfaces thereof are disposed to be substantially perpendicular to an exhaust direction (a front to back direction) of the exhaust gas. The exhaust gas passages 62 and 64 have a shape that is narrowed such that the cross-sectional area is decreased from an inflow side to a discharge side of the exhaust gas, and opposite wall surfaces 62b and 64b that are two wall surfaces opposite to each other are disposed obliquely. Meanwhile, the two non-opposite wall surfaces (non-opposite wall surfaces) 62a and 64a are parallel to each other or have an interval that is widened or narrowed slightly toward a discharge side. An angle formed between the non-opposite wall surfaces at this time may be smaller than an angle formed between the opposite wall surfaces. In the case of the above-mentioned shape, a direction of the exhaust gas discharged from the exhaust gas passages 62 and 64 is mainly determined by an attachment angle of the two opposite wall surfaces 62b and 64b that oppose each other.

An opening section 67 having a substantially rectangular shape into which the spark arrester 70 having a metal net shape is inserted in a direction of an arrow 72 is formed at a rear side of the exhaust gas restriction member 60. A step difference 61a is processed by punching at a front side of the opening section 67 of the exhaust gas restriction member 60 such that a planar section 61 protrudes with respect to a circumferential edge portion by an extent of a thickness of the spark arrester 70, and the spark arrester 70 can be mounted or removed after fixing the exhaust gas restriction member 60 to the outer housing 52 through brazing or the like. A guide section 68 formed in a slightly curved shape and configured to guide the discharged exhaust gas in a predetermined direction is formed at a rear side of the opening section 67 while guiding the spark arrester 70 upon mounting. The guide section 68 can be formed by cutting three metal sides of the opening section 67 and folding them at a rear side. The spark arrester 70 mounted inside further than the opening section 67 is fixed by a screw 74 (see FIG. 5, which will be described below) threadedly engaged through screw holes 66 and 52c.

The heat shield plate 30 is disposed between the muffler 50 and the cylinder 13 of the engine 10. The heat shield plate 30 is a foil formed of a metal such as iron, aluminum alloy, or the like, and fastened together with the muffler 50 by the bolts 76a and 76b. The heat shield plate 30 performs not only a function as a heat shield plate configured to prevent transfer of radiant heat of the muffler 50 toward the cylinder 13 or transfer radiant heat of the cylinder 13 side toward the muffler 50 but also a function as an airflow break plate configured to increase a cooling effect due to the cooling air by defining the inside of muffler receiving chamber. The heat shield plate 30 has an area larger than a side portion of the muffler 50 facing the cylinder 13, and an outer edge portion is formed in a shape that abuts or approaches an inner wall of the muffler cover 4. In the embodiment, the heat shield plate 30 is mainly constituted by a planar plate 31 extending in a moving direction (a vertical direction) of the piston and a horizontal plate 32 extending in a direction (a horizontal direction) perpendicular to movement of the piston, and defines a vertical surface of a side of the muffler 50 facing the engine 10 and an air duct of the cooling air flowing around the muffler 50 by covering a lower side of the muffler 50. An opening 33 to be positioned at the exhaust opening 13b (see FIG. 2) of the cylinder 13 and through which the exhaust gas passes, and through-holes 34a and 34b formed in the vicinity of the opening 33 and through which the bolts 76a and 76b pass, are formed in the planar plate 31. A notch portion 31a that forms an opening section configured to introduce some of the cooling air into the muffler chamber from the cylinder 13 side is formed in an end portion of a front side of the planar plate 31. In addition, notch portions 35a and 35b cutout in the forward/rearward direction to avoid boss sections (not shown) of the crank case 15 are formed in the vicinity of a center in the upward/downward direction. While the horizontal plate 32 has a size sufficient to cover substantially the entire bottom surface portion of the muffler 50, an extension section 32b having a horizontal plate shape extending further forward is formed therein. The extension section 32b guides an air flow CA3 sent from the cooling fan such that it effectively flows toward a rear side along a lower surface of the muffler 50.

Figure 5:
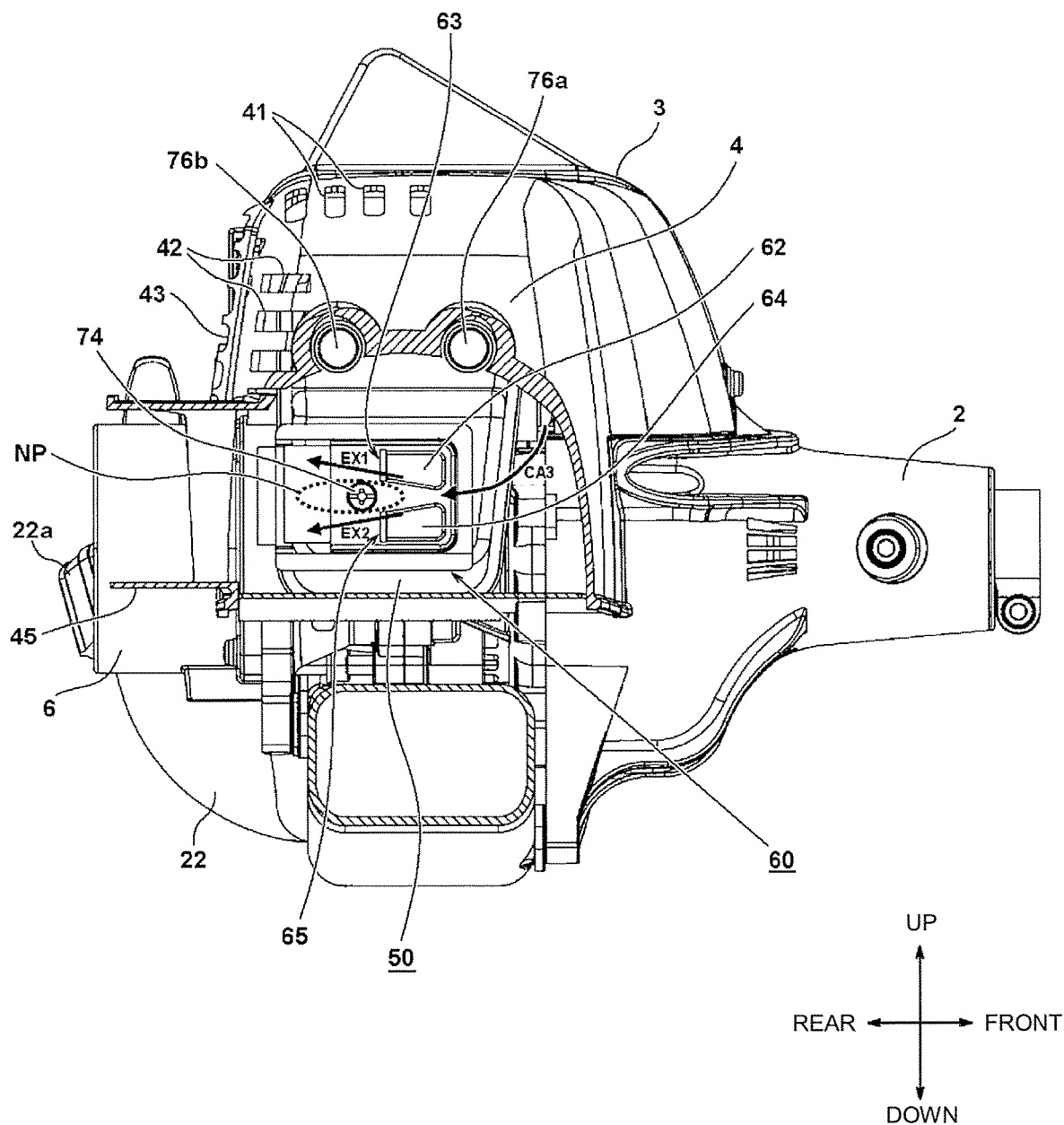
FIG. 5 is a cross-sectional view taken along line D-D of FIG. 2.

Next, the exhaust gas restriction member 60 fixed to the muffler 50 will be further described with reference to FIG. 5. FIG. 5 is a cross-sectional view taken along line D-D of FIG. 2. The exhaust gas passages 62 and 64 are formed to have a large width only in the upward/downward direction of the front side, i.e., a width when seen in the upward/downward direction is reduced toward the openings of the exhaust openings 63 and 65 (see FIG. 4) of the rear side, and have a shape narrowed toward an outlet side of the exhaust gas. An outflow direction of the exhaust gas is determined by a characteristic structure of narrowing-down. While an upper wall of the exhaust gas passage 62 is substantially horizontally formed, a lower wall is formed to be inclined such that a position in the height direction is increased from a front side to a rear side. As a result of such a shape, a direction of a flow EX1 of the exhaust gas is slightly upward further than a horizontal direction when seen in a side view. Similarly, while a lower wall of the exhaust gas passage 64 is formed to be substantially horizontal, an upper wall is formed to be inclined such that a position in the height direction is decreased from the front side to the rear side. As a result of such a shape, a direction of a flow EX2 of the exhaust gas is slightly downward further than the horizontal direction. As can be understood from the flows EX1 and EX2 of the exhaust gas when seen only in a right side view, these directions are not parallel and are set such that the interval is widened away from the exhaust openings 63 and 65. As the directions of the two exhaust flows EX1 and EX2 are set in this way, a space having a negative pressure lower than that of a peripheral portion is formed at a portion NP shown by a dotted line. In order to generate the negative pressure, since the opposite wall surfaces of the exhaust passages are formed to be inclined at about 3 to 30 degrees to be separated toward a downstream side in an exhaust gas outflow direction, in the embodiment, such that an opening angle is about 20 degrees, the exhaust gases EX1 and EX2 can be prevented from attracting and joining to each other by an ejector effect thereof.

In the embodiment, in a state in which the ejector effect is obtained in this way, a cooling air CA3 generated by the cooling fan (the magnet rotor 17) and blown to surroundings of the muffler 50 is mixed with the exhaust gases EX1 and EX2. Since an inlet of the cooling air CA3 is installed diagonally in the vicinity of the exhaust outlet in the muffler receiving chamber, at least some of the cooling air CA3 introduced into the muffler receiving chamber flows along the surface of the muffler 50 and the cooling air CA3 after cooling the right side surface is to be suctioned to the side surfaces of the exhaust gas passages 62 and 64 or a negative pressure portion NP when flows therebetween, the exhaust gases EX1 and EX2 are effectively mixed and directed toward the extension passage 44. In this way, in the embodiment, since the exhaust gas passages 62 and 64 are formed as passages (pipelines) independent from each other, the passage of the cooling air CA3 can be secured between the exhaust gas passages 62 and 64, air is supplied to the negative pressure portion formed between the exhaust gases also from a space in a direction perpendicular to the exhaust passage (a non-exhaust gas outflow direction) by the air passage, and an exhaust gas temperature can be further reduced. In addition, since the plurality of ventilator windows 47 (see FIG. 1) are installed at a side surface of the muffler cover 4 around the negative pressure portion NP, a larger amount of air can be supplied into the negative pressure region (space) NP from the outside of the muffler cover 4. As a result, since the cooling air CA3 or the external air having a low temperature effectively hits the portion shown by the dotted line NP, the temperature in the vicinity of the portion surrounded by the dotted line in the drawing can be effectively decreased, and an increase in temperature of the exhaust gas restriction member 60 or the muffler 50 (in particular, the outer housing 52) can be suppressed. As a result, since the non-opposite wall surfaces of the exhaust passages are formed in parallel, it is possible to suppress the exhaust gas flowed out of the exhaust passage from being excessively diffused and damaging synergy of the ejector effect. Further, since the exhaust gases are not diffused excessively and do not inadvertently come in contact with the muffler cover, occurrence of thermal degradation in the muffler cover 4 can also be effectively suppressed.

Figure 6:
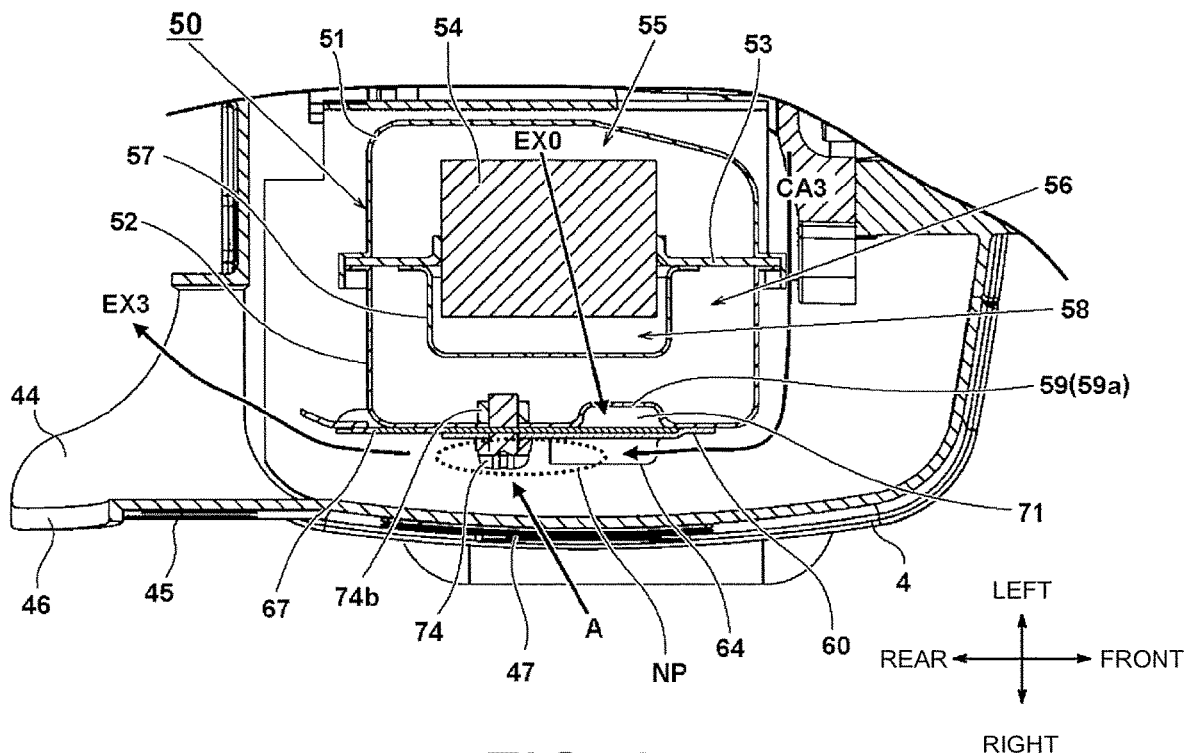
FIG. 6 is a partial cross-sectional view in the vicinity of the muffler 50 in a cross section taken along line C-C of FIG. 1.

FIG. 6 is a partial cross-sectional view in the vicinity of the muffler 50 in a cross section taken along line C-C of FIG. 1. Since an appearance of the muffler 50 is defined by the inner housing 51 and the outer housing 52, and the inner housing 51 and the outer housing 52 are joined via the partition plate 53, the first expansion chamber 55 in communication with the exhaust opening 13b of the cylinder 13 and the second expansion chamber 56 having the exhaust gas outlet 59a configured to discharge the exhaust gas to the atmosphere are defined. While a catalyst 54 configured to purify the exhaust gas is installed between the first expansion chamber 55 and the second expansion chamber 56 and an exhaust gas EX0 passes through the catalyst 54 installed in the opening section of the partition plate 53 to flow from the first expansion chamber 55 toward the second expansion chamber 56, here, a catalyst cover 57 configured to suppress an increase in temperature of the outer housing 52 such that a high temperature exhaust gas discharged from the catalyst 54 does not directly abut the outer housing 52. The partition plate 53 and the catalyst cover 57 may be formed by punching, for example, a stainless plate. A third chamber 58 is formed at an outlet side of the catalyst 54 by the catalyst cover 57, and the exhaust gas EX0 flows into the second expansion chamber 56 via the third chamber 58. The exhaust gas expanded in the second expansion chamber 56 is discharged from the exhaust gas outlet 59a formed in the cavity 59 toward the space 71, and discharged into a space (a muffler chamber) between the muffler cover 4 and the muffler 50 through the exhaust gas passages 62 (see FIG. 4) and 64 of the exhaust gas restriction member 60. A nut 74b threadedly engaged with the screw 74 is welded to an inner portion (in a second expansion chamber of the muffler 50) of the screw hole 52c (see FIG. 4).

A space between the muffler cover 4 and the muffler 50 is a space spaced a predetermined interval therefrom such that radiant heat of the muffler 50 cannot be easily transferred to the muffler cover 4 formed of a synthetic resin, and some of the cooling air from the engine side of a front side of the space flows like CA3 in the drawing. The introduced cooling air CA3 flows from the front side surface of the muffler 50 through the upper, lower, right and left side surfaces of the muffler 50, and is discharged to the outside from the outlet of the muffler cover 4 disposed to oppose the rear side surface of the muffler 50. Here, some of the cooling air flows like CA3 to be discharged to the outside while being mixed with an exhaust gas EX3 discharged from the exhaust gas passages 62 and 64 (in the drawings, only 64 is shown). Since the external air is directly suctioned from the ventilator window 47 of the muffler cover 4 into the negative pressure region portion NP like an arrow A and the external air introduced in addition to the cooling air CA3 is also mixed, the temperature of the exhaust gas EX3 can be further decreased. Since the plurality of ventilator windows 45 are also installed at the side surface of the extension passage 44, a temperature of the exhaust gas can be further decreased by introducing new external air.

Hereinabove, according to the present invention, since the exhaust gas passages 62 and 64 are disposed such that the outlets for the exhaust gases EX1 and EX2 are spaced apart from each other while being disposed substantially in parallel, a strong negative pressure can be generated by the exhaust gases having a high flow velocity flowed out of the exhaust gas passages 62 and 64, and a large amount of air can be suctioned from the surroundings. Since the air is mixed with the exhaust gas, the exhaust gas temperature can be effectively reduced. Here, while the air temperature in the muffler cover is increased by being heated by the muffler surface, the external air temperature is a normal temperature (for example, 20° C.) with no increase. Accordingly, since a normal temperature air that is not heated by a heating surface such as the engine, the muffler surface, or the like, can be directly supplied to the exhaust gas, the exhaust gas temperature can be further reduced. In addition, while a temperature of the ventilator window section of the muffler cover is increased by radiant heat of the muffler, since the muffler cover is cooled by a flow of the external air, an effect of reducing the muffler cover temperature can also be exhibited.

Embodiment 2

Figure 7:
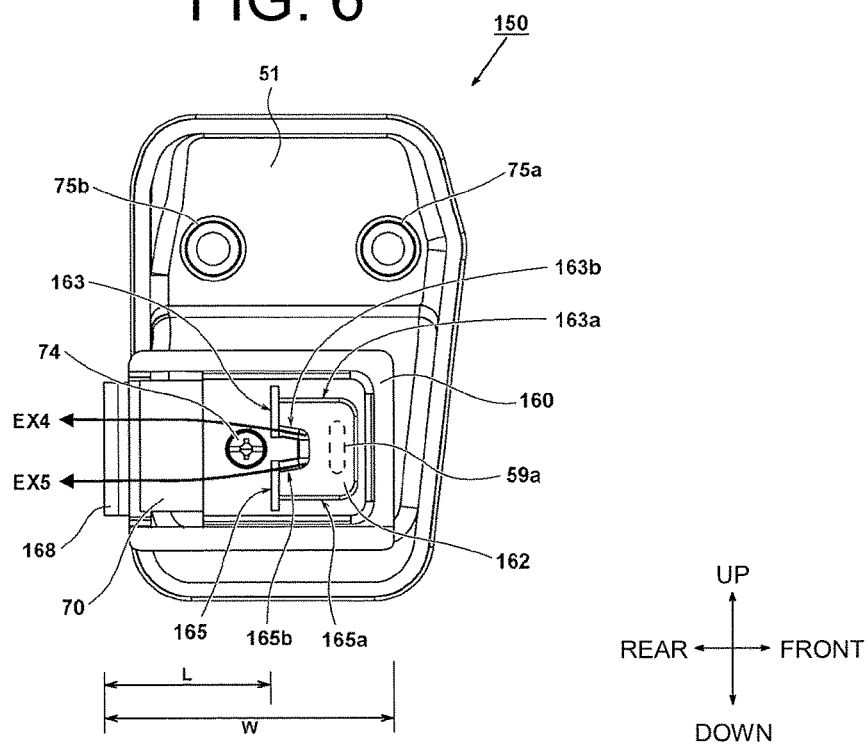
FIG. 7 is a side view of a muffler 150 of an engine-driven working machine according to a second embodiment of the present invention.

Next, a second embodiment of the present invention will be described with reference to FIG. 7. A difference between the second embodiment and the first embodiment is a shape of an exhaust gas restriction member 160, in particular, a shape of an exhaust gas passage 162. The outer housing 52 and the inner housing 51 that are major parts of a muffler 150 and the internal configurations are the same as in the first embodiment. In the shape of the exhaust gas restriction member 160, the exhaust gas passage 162 in which an introduction side becomes a common space at a position opposite to the exhaust gas outlet 59a is formed, and a pipeline in which two opening sections 163 and 165 are formed at a rear side of the exhaust gas passage 162 is formed to be branched separately and extend. For this reason, an upper wall surface 163a and a lower wall surface 165a extending in a substantially horizontal direction are formed at the exhaust gas passage 162, and two opposite wall surfaces 163b and 165b are formed therebetween when seen in the upward/downward direction. Even in the configuration, since the non-opposite wall surfaces (the upper wall surface 163a and the lower wall surface 165a) of the exhaust passages are formed in parallel and exhaust gases EX4 and EX5 flowed out of the exhaust passages are appropriately diffused, the negative pressure portion is formed in the vicinity of the screw 74, some of the cooling air CA3 or the external air introduced via the ventilator window 47 is mixed with the exhaust gases EX4 and EX5, and temperatures of the exhaust gases EX4 and EX5 can be largely decreased. In addition, since the mixed portion faces a side surface of the muffler 150 (a side opposite to the muffler cover), a local increase in temperature on the wall surface of the muffler 150 can also be suppressed. Here, since the entire length of the exhaust gas restriction member 160 including a guide section 168 of the muffler 150 in the exhaust direction is W, a distance in which the exhaust gases EX4 and EX5 flow along the wall surface is L, and L has a length of a half or more of W, a negative pressure effect can be further increased by the wall surfaced. Since the diffused exhaust gases EX4 and EX5 are guided to the outlet side by the inner wall portion of the muffler cover 4, occurrence of an overheated state in which thermal degradation occurs in a portion of the muffler cover 4 can be suppressed.

Hereinafter, while the present invention has been described based on the first and second embodiments, the present invention is not limited to the above-mentioned embodiments and various modifications may be made without departing from the spirit of the present invention. For example, in the embodiment, while the number of the exhaust openings 63 and 65 is two, three or more openings may be provided as long as any two of the openings have the above-mentioned relation. Further, in the embodiment, while the example applied to the engine configured to introduce some of the cooling air generated by the cooling fan into the muffler chamber has been described, the example can also similarly applied to an engine configured to decrease a temperature of the muffler and the exhaust gas by only suctioning external air using a negative pressure generated without using cooling air generated by the cooling fan.

The invention claimed is:

1. An engine comprising: a cylinder having a plurality of fins at an outer circumferential section thereof and in which a combustion chamber is formed; a cooling fan installed at one end of a crankshaft and configured to generate cooling air to cool the cylinder; and a muffler attached to an exhaust opening of the cylinder, wherein an exhaust gas outlet is installed at the muffler, an exhaust gas restriction member configured to determine a discharge direction of exhaust gases is installed at the exhaust gas outlet, and the exhaust gas restriction member is configured to have a plurality of exhaust passages arranged in parallel such that exhaust directions of the exhaust gases are spaced apart from each other,
wherein the exhaust gas restriction member is manufactured by punching of a metal plate, each of the plurality of exhaust passages is a convex section formed by punching, and an opening is formed in an end portion of the convex section.

2. The engine according to claim 1, wherein some of the cooling air is introduced in the exhaust direction of the exhaust gas of the muffler.

3. The engine according to claim 1, wherein a muffler cover configured to cover the muffler to form a muffler receiving chamber is provided, and the exhaust gas restriction member is configured to discharge the exhaust gas in a space between the muffler cover and the muffler.

4. The engine according to claim 3, wherein the muffler cover has a ventilator window, and external air passing through the ventilator window is introduced into between the exhaust gases discharged from the plurality of exhaust passages.

5. The engine according to claim 4, wherein the exhaust gas restriction member is configured to hold a spark arrester installed at the exhaust gas outlet, and the exhaust gas passing through the spark arrester is discharged through the exhaust passage.

6. The engine according to claim 1, wherein the exhaust direction of the exhaust gas is configured to allow the exhaust gas to flow along an outer surface of the muffler, and the exhaust gas flows from an opening of the exhaust passage to an end surface of the muffler to be discharged into the atmosphere.

7. The engine according to claim 1, wherein the muffler configures a casing by matching opening surfaces of a first housing and a second housing to each other via a partition plate, a first expansion chamber into which the exhaust gas from the exhaust opening of the cylinder is first introduced and a second expansion chamber through which the exhaust gas introduced via a through-hole is discharged to the atmosphere from the exhaust opening are configured by forming the through-hole in the partition plate, the first housing is connected to the exhaust opening, and the exhaust gas restriction member is disposed at one surface of the second housing opposite to the cylinder.

8. The engine according to claim 1, wherein opposite wall surfaces of the exhaust passages are formed to be inclined to be spaced apart from each other toward a downstream side of the exhaust gas outflow direction.

9. The engine according to claim 8, wherein the plurality of exhaust passages have non-opposite wall surfaces and are formed to have an angle smaller than that formed between the opposite wall surfaces.

10. The engine according to claim 8, wherein the plurality of exhaust passages are independently formed from an inlet side to an opening of an outlet.

11. The engine according to claim 8, wherein the plurality of exhaust passages are formed such that introduction sides have a common space, and a plurality of pipelines that form openings independent from the common space are formed to extend from the exhaust gas restriction member.

12. An engine-driven working machine configured to operate a working device using the engine according to claim 1.

* * * * *